Patented May 14, 1940

2,200,469

UNITED STATES PATENT OFFICE 2,200,469

ANTICORROSIVE AND ANTIFOULING COATING AND METHOD OF APPLICATION

George Chandler Cox, Charleston, W. Va.

No Drawing. Application November 8, 1939,
Serial No. 303,452

15 Claims. (Cl. 204—1)

This application is a continuation in part of application #116,039, filed December 15, 1936, entitled Antifouling coating and process of application.

This invention relates to improved types of coating for protecting metallic surfaces in contact with sea water, or other liquid containing soluble calcium or magnesium salts, and to improved procedures for forming and maintaining the desired type of anticorrosive or antifouling coating.

Many protective materials and processes of treatment have been used with varying degrees of success for producing coatings and paint films which inhibit the corrosion of iron or steel surfaces in contact with sea water, or other solutions containing similar soluble salts. In general, those materials which reduce the solubility of ferrous hydroxide have been the most useful nonmetallic ingredients in paints for inhibiting the corrosion of iron and steel in contact with sea water and like solutions. Likewise many types of coating or methods of treatment have been proposed for preventing the attachment to, or for removing from the submerged surfaces of ships the growths of such organisms as algae, barnacles, hydroids, bryozoa, etc. Paint coatings containing compounds of copper and mercury which poison the organisms have been useful for preventing the attachment of the fouling organisms. For removing attached organisms from the submerged surface of a ship, the exfoliation types of paint coatings, such as the grease paints, have been useful. Between these two extreme types of useful antifouling coatings are other types exhibiting in varying degrees both the characteristics of a poison and an exfoliation type of coating.

An object of this invention is the production and maintenance of a renewable anticorrosive type of coating for protecting metallic surfaces which are exposed to liquids containing soluble salts of magnesium or calcium in greater, equal, or less concentration than occur in normal sea water.

Another object of this invention is the production and maintenance of a renewable antifouling type of coating on metallic surfaces exposed to the fouling types of organism in sea water.

Another object of this invention is to form and maintain a corrosion inhibiting coating on the submerged surfaces of metallic sheathing on or around a non-metallic marine structure, such as the hull sheathing of a wooden ship, or the underwater sheathing of a wood or concrete pile structure.

Another object of this invention is the process of continuously or intermittently applying a suitable coating to the metal sheathing or metal hull of a ship while at rest or in transit, and when desired of removing part or all of the coating with attached fouling matter by any economic means, as for example mechanical or electrical means, and of reforming a suitable protective coating.

Another object of this invention is the provision of a self-healing protective coating process for metal surfaces in contact with waters containing soluble magnesium or calcium salts.

A further object of this invention is the provision of an electrolytically formed coating on a metal surface which has a low solubility and which ionizes with an alkaline reaction.

A further object of this invention is the continuous or intermittent formation of a coating of solid material which will inhibit the corrosion of iron, steel and other commercial metals and alloys when in contact with water solutions of magnesium or calcium salts.

Although many compounds and practically all of the elements have been isolated from sea water, the four inorganic compounds occurring in the greatest quantity may be listed as having the following approximate concentrations throughout the various oceans at a distance of several miles from land:

| | gms. per liter |
|---|---|
| Sodium chloride, about | 26.5 |
| Magnesium chloride, about | 3.2 |
| Magnesium sulphate, about | 2.1 |
| Calcium sulphate, about | 1.4 |
| Other salts, possibly | 1.5 |

Because of dilution, the sea waters of many harbors and ports contain varying concentrations of these salts. Therefore, sea water will be herein defined as water having a total saline content not greatly in excess of the above approximate concentrations and not materially less than one-fourth of these approximate concentrations.

Through the use of the magnesium and/or calcium salts as raw material or materials, a firm, dense coating may be formed on the surface of a metallic body in contact with sea water or in contact with a water solution of one or more such magnesium or calcium salts, when the metallic body is made cathodic at a suitable current density. Depending upon the conditions imposed during the electrolysis, the coating as formed consists largely of basic magnesium and/or calcium compounds.

Extensive experiments on the process and types of coating herein described and claimed have been conducted in waters containing widely different concentrations of these magnesium and calcium salts. Excellent protective coatings have been formed from northern and tropical sea waters; from sea water in various sea ports and harbors which have been diluted with fresh water; and from highly concentrated solutions of one or more of these soluble magnesium or calcium salts. These experiments have demonstrated that, under properly controlled conditions, a dense, fine-grained, firmly adhering coating may be laid down on a metal surface which will protect the metal surface from corrosion for many hours after the electric current required to form the coating has been stopped. For example, no corrosion could be detected by metallographic or chemical means on mild steel ship plate which had been submerged in sea water for more than fourteen months and treated at a cathodic current density of 0.1 ampere per square foot for 24 hours out of every 72 hours. In another test mild steel ship plate was continuously treated for 12 days at a current density of 0.1 ampere per square foot and then left submerged without any current flow. After two weeks, no evidence of corrosion was observed.

A protective coating is herein defined as a coating of solid products which, when cathodically deposited from sea water on the surface of a rustable iron article, will inhibit the corrosion of the article for a period of hours, and sometimes days, after the current flow has been stopped. The anticorrosive properties of such coatings of solid products are largely dependent upon the chemical properties of the deposited material, particularly its basicity.

Although such a coating exerts a certain preventive action to the attachment of fouling growths, the antifouling properties of such a coating, cathodically formed from a sea water electrolyte, are largely dependent upon the physical properties of the deposited material, particularly its exfoliation properties. In contrast to the method of forming a multilayer paint coating, examinations indicate that the outer surface material of a coating formed by this process is deposited first and then the inner material in contact with the metal surface is deposited. Hence, by this process of depositing successive layers of material underneath previously deposited layers, a condition will eventually be reached when the outer layers of the coating become friable and exfoliate or flake. The intermittent formation of the coating material has been found to increase the exfoliation properties of the coating; probably due to quite definite layer formations resulting from the intermittent treatment. Exfoliation can also be effected by an increase of cathodic current density above that used for forming a coating.

Conversely, exfoliation or flaking of a previously formed coating can be depressed by a reduction in cathodic current density below the forming current density. In addition to an electric energy saving, an advantage of this procedure is that the slightly soluble previously-formed coating may be maintained for an extended period of days or weeks. During extended tests no marine fouling organism has been observed which has been able to eat through such a coating and attach itself directly to the metal surface being protected. However, many of these organisms have succeeded in gaining attachment to the outer surface of such a coating.

After allowing fouling organisms to attach to a previously formed coating, these growths can be removed by any of the previously discussed scopes or variations of procedure which are summarized as follows: (1) By regulating the current density so that a slight excess of new coating material will be formed, the coating can be built up or conditioned until the outer material becomes slightly friable, when it, with the attached fouling matter, can be mechanically removed as by scraping. This scraping may be done without drydocking a ship. (2) With additional coating formation, the outer material will become sufficiently friable to be mechanically removed, together with the fouling matter, when the surface is moved rapidly through the water. (3) With still more coating formation, the outer material will not further support the fouling matter due to the exfoliation of the outer layers or outer material of the coating. (4) By the intermittent cathodic deposition of these basic magnesium and calcium compounds from sea water, good exfoliation properties can be given to a coating. (5) After the formation of a suitable protective coating at one cathodic current density, exfoliation or flaking can later be caused by an increase in current density above that used for forming the original coating. (6) Combinations of two or more of the above means of removing fouling matter, with or without the intermediate step of maintaining the coating over extended periods of time are often desirable.

Except where the outer material and attached fouling matter is removed as by mechanically scraping the surface, these antifouling scopes or variations of procedure are applicable to a vessel in motion. These antifouling scopes or variations of procedure require the following steps which may be indefinitely repeated: (a) the cathodic formation on a metallic surface of a firmly attached coating which consists essentially of basic compounds, to which fouling organisms may attach, (b) then conditioning the coating and causing the removal of fouling matter as summarized above and, (c) then reforming a protective coating. For illustration, the repetition of these steps at intervals of about one day to intervals greater than one month, has produced useful antifouling results as well as a renewable protective coating on the metallic surface in contact with sea water.

An illustration of a method by which this coating may be applied to the hull of a steel ship or metal sheathing of a wooden ship will now be given, although the details of the application, especially the anode arrangement, may be varied to meet the particular application. For instance, the anode arrangement and composition suitable for use on a high speed ship may be quite different from that most suitable for use on a low speed ship.

Depending upon the size of the ship, the conductivity of the hull, or its sheathing, and the requirement for a minimum of stray currents in the internal structure of the ship, the metal hull or sheathing is connected at one or more places to the negative pole of a suitable electric generating device. Direct current from a generator or rectifier is normally required; however excellent coatings have been produced from pulsating direct current similar to that obtained from "half wave" rectification of alternating current. The positive pole of the generating device is connected to one or more anodes submerged in the sea water at a suitable distance from the ship hull. For a small ship one anode may be sufficient, and for larger ships several anodes may be used. These anodes could be let out at various locations from the bow to the stern at suitable distances from the sides of a vessel, or they can be arranged so that they will be pulled through the water underneath a ship at a desired distance below the hull. If it is desirable to use these anodes in transit, the anodes may be suitably streamlined in order to offer minimum frictional resistance. Both soluble anodes, such as iron, and insoluble anodes, such as graphite, have been used for protecting stationary and moving structures. The use of the cheaper forms of iron or steel wire cables is economical for certain anode installations. Either for a ship installation or a stationary marine structure, it is desirable to keep the distance between the anode or anodes and the submerged metal surface to be coated as great as is practically possible, thereby effecting more uniform current distribution on the submerged surface. For example, distances of five to more than thirty feet from the surface being coated to an anode have given good results.

Except that the details of construction are materially simplified, especially the anode arrangements above described, this coating and the different scopes or variations of coating control can be applied to any sheathed or metallic marine structure such as piling, bulkheads, floating drydocks, tanker compartments, brine tanks, etc.

The coating process is of the self-healing type in that the overall electrolytic resistance is lowered at an area where the coating is removed. Such an area is therefore subjected to a greater current density until the coating is renewed.

After a suitable coating has been formed, it has been observed that the coating can be maintained at a cathodic current density lower than that required to form the coating. Observations indicate that the maintenance of a coating of these basic magnesium or calcium compounds requires a cathodic current density which will supply these compounds at a rate equal to their solution rate; whereas to form such a coating requires a current density which will supply these compounds at a rate greater than their solution rate. Other factors being equal in normal sea water, the solution rate of these basic coatings approaches a minimum on the submerged metal surfaces of stationary marine structures such as piles, bulkheads, piers, floating docks and the like. For such structures a cathodic current density of about 0.03 ampere per square foot will deposit these basic compounds at a rate slightly faster than their solution rate, and a firm, dense adherent, coating will be formed.

As the relative velocity between the surface which is being protected and the sea water is increased, the solution rate of the coating is increased slightly. However, test data indicate that the increase in current density required to maintain a coating on a metal surface is not directly proportional to the relative velocity between sea water and the metal surface but is less than such a proportionality. For example a cathodic current density of 0.05 ampere per square foot was slightly greater than required to maintain a protective coating of basic solid materials on a steel surface moving through tropical sea water at a relative velocity of about 21 knots per hour. The results indicate that 0.04 ampere per square foot should have been a sufficient current density to maintain this coating.

When sea water is electrolyzed, the upper limit of cathodic current density for producing a protective coating without excessive flaking and without useless expenditure of electrical energy, has been found to be in the order of 0.4 ampere per square foot of surface under treatment.

Within the above defined broad limits of 0.03 and 0.4 ampere per square foot of cathode surface for forming protective coatings from sea water, as defined, various specific control limits of cathodic current density are approximately as follows: (a) When it is essential to quickly form a protective coating, limits of about 0.1 to 0.4 ampere per square foot are required; however excessive power requirements are involved. (b) When time is of no consideration and power requirements must be held at a minimum, the lower range of 0.03 to 0.1 ampere per square foot should be used for a total time of at least 24 to 36 hours. (c) The most useful preferred range of the current density control limits for forming dense, hard coatings has been found to be from 0.03 to 0.3 ampere per square foot. (d) When a surface is moving through sea water at high speed, the lower limit of current density for maintaining a coating should be approximately 0.04 ampere per square foot.

Firm, dense, adherent, protective coatings have similarly been produced on a cathodic surface from concentrated solutions of these soluble magnesium or calcium salts, or from concentrated sea water, at current densities between the limits of 0.02 and 0.4 ampere per square foot.

In many locations, particularly in tropical sea waters, steel piling or steel sheathing on piling and similar steel structures deteriorate at an extremely rapid rate. Tests indicate that this method will successfully inhibit this deterioration over an extended period of time.

Another application of this process is the provision of a protective coating on the inside of the compartments of a tanker ship. After discharging its liquid cargo, the customary procedure for a ship of a tanker fleet is to fill one or more of the cargo compartments with sea water for ballast on its return journey. Serious corrosion of the inner steel surface of the compartment results, particularly in the tankers used by the petroleum industry. Tests indicate that through the use of this method during part or all of the return journey a protective coating of basic materials can be deposited on the inner surface of these compartments while filled with sea water; and that this coating will inhibit corrosion of the compartment while filled with the liquid constituting the cargo during its transportation.

By cathodically forming a coating of these basic solid materials from sea water or like solutions, and then removing the solution; it has been found that this coating will inhibit the corrosion of a steel or iron surface for extended periods of time when the surface is put in contact with other corrosive fluids of a basic, neutral or slightly acidic character.

This coating and method of application when operated within the scope of the control features set forth, is considered generic to a metallic surface or part in contact with or submerged in sea water (as defined), or a solution of equal or greater magnesium or calcium salt concentration. In regard to species, it is applicable to: (1) the exposed under water hull surface or part of a metallic or metal-sheathed ship in sea water, (2) the exposed under water hull surfaces of metallic or metal-sheathed marine piling and similar structures in sea water, (3) the interior metallic surfaces of a compartment, as a tank, etc., which is continuously or intermittently subjected to a solution of sea water or to a solution of equal or greater magnesium or calcium salt content.

Having described my invention, what I claim is:

1. The process of producing a protective coating on the exposed metallic part of ships' bottoms and other submerged structures which comprises the steps of submerging the part in water containing magnesium and calcium salts within the ranges of concentration customarily found in sea and sea port waters, making the submerged part cathodic and maintaining the cathodic current density between the limits of 0.1 to 0.4 ampere per square foot of cathode surface for a time at least sufficient to form a firm dense adherent coating.

2. The process of producing a protective coating on the exposed metallic part of ships' bottoms and other submerged structures which comprises the steps of submerging the part in water containing magnesium and calcium salts within the ranges of concentration customarily found in sea and sea port waters, making the submerged part cathodic and maintaining the cathodic current density between the limits of 0.1 to 0.4 ampere per square foot of cathode surface for at least 24 to 36 hours.

3. The process of producing a protective coating on the exposed metallic part of ships' bottoms and other submerged structures which comprises the steps of submerging the part in water containing magnesium and calcium salts within the ranges of concentration customarily found in sea and sea port waters, making the submerged part cathodic and maintaining the cathodic current density between the limits of 0.03 to 0.1 ampere per square foot of cathode surface for a total time of at least 24 to 36 hours, and flaking off the coating if and when desired by an increase in current density and then reforming the coating within the specified current density ranges.

4. The process of producing a renewable protective coating on the metallic surface of a marine structure which is in contact with sea water and which comprises the steps of making the surface cathodic and maintaining the cathodic current density between the limits of 0.03 to 0.4 ampere per square foot of cathode surface for a time at least sufficient to form a firm dense adherent coating, and removing the outer material of the coating with attached growths when desired, and then forming additional protective coating within the specified current density ranges.

5. The process of producing a renewable protective coating on the exposed metallic surface of ships' bottoms and other structures which comprises the steps of submerging the surface in water containing magnesium and calcium salts within the ranges of concentration customarily found in sea and sea port waters, making the submerged surface cathodic intermittently as required at cathodic current densities between the limits of 0.03 to 0.4 ampere per square foot of cathode surface for at least a sufficient time to form a firm dense adherent coating.

6. The process of producing a protective coating on the exposed metallic part of ships' bottoms and other submerged structures which comprises the steps of submerging the part in water containing magnesium and calcium salts within the ranges of concentration customarily found in sea and sea port waters, cathodically applying a pulsating direct current, the current pulsations of which are controlled between the limits of 0.03 and 0.4 ampere per square foot of cathode surface for at least a sufficient time to form a firm dense adherent coating.

7. A protected metal article comprising a metallic base and a firm dense adherent coating consisting essentially of basic magnesium and calcium compounds directly adherent thereto, said coating having the characteristics of having been cathodically deposited on said base from an aqueous solution containing magnesium and calcium salts within the limits of concentration customarily found in sea and sea port waters at current densities between 0.03 and 0.4 ampere per square foot.

8. A structural metal article comprising an iron or steel base and a firm dense adherent coating consisting essentially of basic magnesium and calcium compounds directly adherent thereto, said coating having the characteristics of having been cathodically deposited on said base from an aqueous solution containing magnesium and calcium salts within the limits of concentration customarily found in sea and sea port waters.

9. A structural metal article, such as the exposed metallic parts of a ship's bottom or other submerged marine structure, and a firm dense adherent coating protecting the same which consists essentially of basic calcium and magnesium compounds directly adherent thereto, said coating having the characteristics of having been cathodically deposited on said base from sea or sea port waters at current densities between 0.03 and 0.4 ampere per square foot.

10. A pile for a marine structure having an under water metallic surface of iron or steel and a firm dense adherent protective coating consisting essentially of basic magnesium and calcium compounds directly adherent thereto, said coating having the characteristics of having been cathodically deposited on said metallic surface from sea waters.

11. The process of producing a protective coating on the metallic surface of a marine structure which comprises the steps of submerging the surface in sea water, making the submerged surface cathodic and forming a firm dense adherent coating on the structure at a cathodic current density between the limits of 0.03 and 0.3 ampere per square foot and then maintaining the formed coating at a cathodic current density lower than that required to form the coating.

12. The process of producing a protective coating on a metallic surface when in contact with a concentrated solution of the magnesium or calcium salts found in sea water or a solution of concentrated sea water and which comprises the steps of making the metallic surface cathodic and maintaining the cathodic current density above 0.02 ampere per square foot and below 0.4 ampere per square foot for a time at least sufficient to form a firm dense adherent coating.

13. The process of producing a renewable protective coating on the metallic surface of a marine structure which is in contact with sea water and which comprises the steps of making the surface cathodic and maintaining the cathodic current density between the limits of 0.03 to 0.4 ampere per square foot of cathode surface for a time at least sufficient to form a firm dense adherent coating.

14. The process of protecting the interior metallic surface of a compartment with a coating of basic solid materials which comprises the steps of introducing into the compartment an aqueous electrolyte containing a magnesium or calcium salt in solution of at least the concentration normally found in sea waters, making this metallic surface cathodic and maintaining the cathodic current density above 0.03 ampere per square foot and below 0.4 ampere per square foot for a time at least sufficient to form a firm dense adherent coating.

15. The process of producing a protective coating on the interior metallic surfaces of a compartment of a tanker ship which comprises the steps of filling the compartment with sea water, making the inner submerged surfaces cathodic and maintaining the cathodic current density above 0.03 ampere per square foot and below 0.4 ampere per square foot for a time at least sufficient to form a firm dense adherent coating, and then discharging the solution.

GEORGE CHANDLER COX.

Disclaimer 2,200,469.—*George Chandler Cox*, Charleston, W. Va. ANTICORROSIVE AND ANTIFOULING COATING AND METHOD OF APPLICATION. Patent dated May 14, 1940. Disclaimer filed June 10, 1949, by the inventor.
Hereby enters this disclaimer to claims 8 and 10 of said patent.
[*Official Gazette July 12, 1949.*]

Patent No. 2,200,469  Granted May 14, 1940

GEORGE CHANDLER COX

The above entitled patent was extended April 24, 1951, under the provisions of the act of June 30, 1950, for 6 years and 191 days from the expiration of the original term thereof.

*Commissioner of Patents.*